United States Patent [19]

Noguchi et al.

[11] Patent Number: 5,773,784
[45] Date of Patent: Jun. 30, 1998

[54] ELECTRON BEAM PROCESSING APPARATUS

[75] Inventors: Yo Noguchi; Masashi Yamakawa, both of Amagasaki, Japan

[73] Assignee: Mitsubishi Denki Kabushiki Kaisha, Tokyo, Japan

[21] Appl. No.: 534,237

[22] Filed: Sep. 26, 1995

[30] Foreign Application Priority Data

Sep. 30, 1994 [JP] Japan ................................. 6-237859

[51] Int. Cl.⁶ .................................................. B23K 15/02
[52] U.S. Cl. ............................... 219/121.26; 219/121.13
[58] Field of Search ..................... 219/121.12, 121.13, 219/121.25, 121.26, 121.27, 121.3; 250/396 ML

[56] References Cited

U.S. PATENT DOCUMENTS

| | | | |
|---|---|---|---|
| 3,146,335 | 8/1964 | Samuelson | 219/121.26 |
| 3,158,733 | 11/1964 | Sibley | 219/121.26 |
| 3,371,185 | 2/1968 | Anderson | 219/121.26 |
| 3,576,420 | 4/1971 | Iceland et al. | 219/121.26 |
| 4,357,517 | 11/1982 | Sivry et al. | 219/121.26 |
| 4,654,506 | 3/1987 | Sakamoto et al. | 219/121.26 |
| 5,483,036 | 1/1996 | Giedt et al. | 219/121.14 |

FOREIGN PATENT DOCUMENTS

| | | | |
|---|---|---|---|
| 115868 | 10/1975 | Germany | 219/121.26 |
| 139102 | 12/1979 | Germany | 219/121.26 |
| 3718177 | 12/1988 | Germany | 219/121.26 |
| 59-128748 | 7/1984 | Japan . | |
| 6-31465 | 2/1994 | Japan | 219/121.28 |

Primary Examiner—Gregory L. Mills
Attorney, Agent, or Firm—Oblon, Spivak, McClelland, Maier & Neustadt, P.C.

[57] ABSTRACT

An electron beam processing apparatus imparted with capability of preventing occurrence of a failure in welding or the like processing of a workpiece by automatically compensating for changes in a focused position of an electron beam ascribable to time-dependent consumption of a rod-like cathode. The apparatus includes a bias voltage detecting circuit for monitoring a bias voltage applied to the rod-like cathode electrode and an automatic lens-current correcting circuit for controlling lens currents flowing through focusing coils by referencing experimentally obtained relations between the bias voltage or cathode temperature and lens current such that change of the position of the focal point can be nullified.

3 Claims, 7 Drawing Sheets

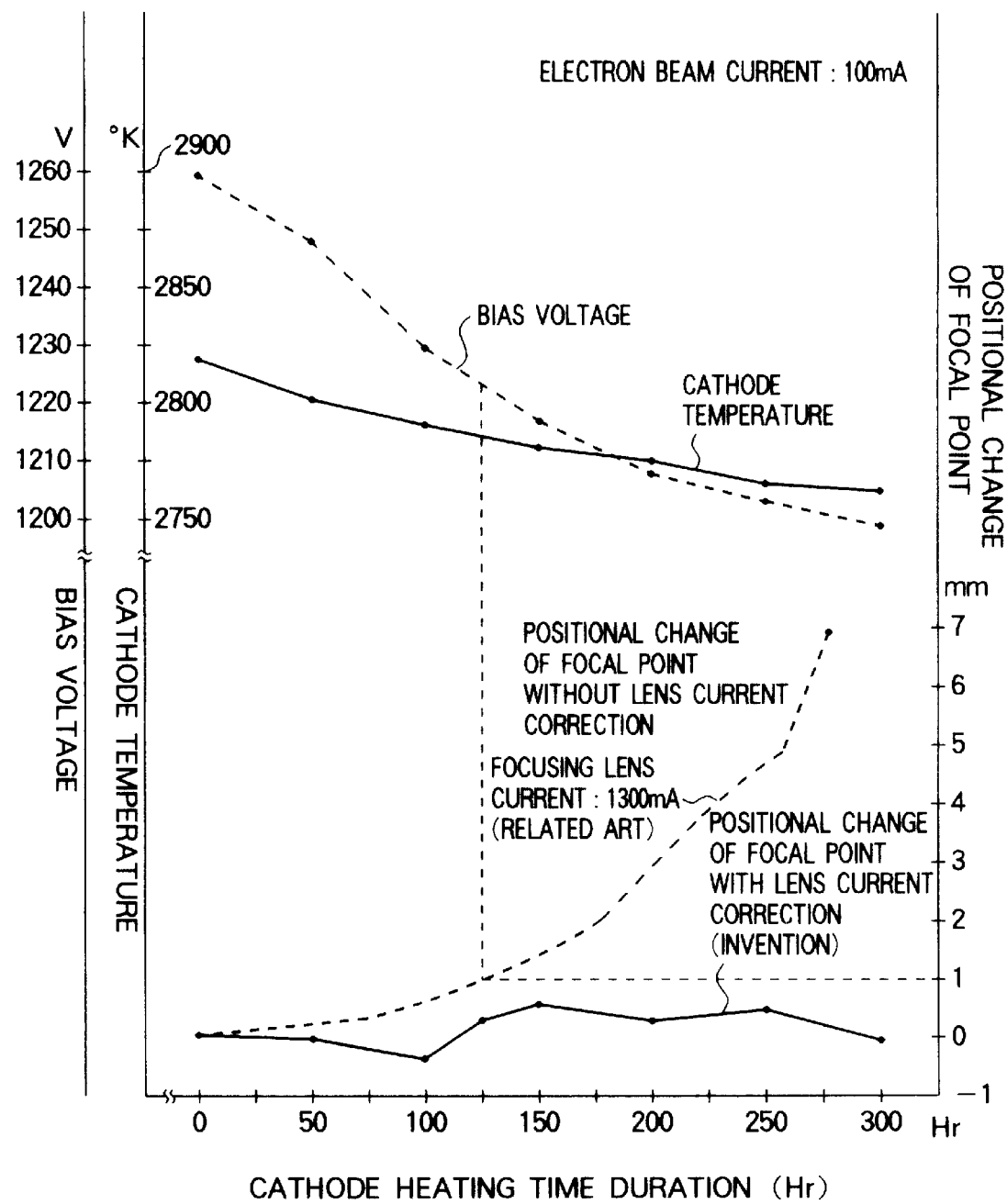

ELECTRON BEAM PROCESSING APPARATUS

BACKGROUND OF THE INVENTION

1. Field of the Invention

The present invention relates in general to an electron beam processing apparatus for welding, bonding cutting or machining or, in more general terms, processing workpieces by making use of an electron beam energy. More particularly, the invention is concerned with an electron beam processing apparatus which is equipped with a control circuit for correcting automatically a lens current supplied to an electromagnetic lens or a focal point correcting electrostatic lens in order to maintain constantly a focal length of an electron beam at a predetermined value.

2. Description of Related Art

As an exemplary or typical electron beam processing apparatus of the aforementioned type which is known heretofore, there may be mentioned an apparatus disclosed in Japanese Unexamined Patent Application Publication No. 128748/1984 (JP-A-56-128748). For having better understanding of the present invention, background techniques thereof will first be described in some detail. FIG. 6 is a circuit diagram showing a circuit configuration adopted in the conventional electron beam processing apparatus such as described in the publication cited above.

As is shown in FIG. 6, the conventional electron beam processing apparatus is comprised of a welding chamber 1 for accommodating therein a workpiece 2 to be welded (hereinafter referred to simply as the workpiece), an electron gun 6 serving as an electron beam generating means for generating an electron beam 3, and a pair of focusing coils 4 and 5 for focusing the electron beam 3 generated by the electron gun 6 for irradiating the workpiece 2 disposed within the welding chamber 1 with the focused electron beam 3. The electron gun 6 is supplied with electric powers from a filament power supply circuit 7 for generating the electron beam 3, a bombarding potential supply circuit 8 and a bias voltage source circuit 9, which will hereinafter be described in more detail.

Further, an accelerating potential supply circuit 10 is provided for accelerating the electron beam 3. The accelerating potential supply circuit 10 is composed of a smoothing capacitor 14, a rectifier circuit 15 and a step-up transformer 16, wherein a primary winding of the step-up transformer 16 is connected to an AC power supply 20 by way of a voltage regulator 17 while a secondary winding of the step-up transformer 16 is connected to an input side of the rectifier circuit 15. On the other hand, the rectifier circuit 15 has one output terminal connected to the bombarding potential supply circuit 8 and the bias voltage source circuit 9 and the other output terminal which is connected to the ground potential via a beam current detecting resistor 13 which is used for detecting the electron beam current. Further connected between the two output terminals of the rectifier circuit 15 is a serial connection of voltage divider resistors 11 and 12 for detecting an output voltage of the accelerating potential supply circuit 10, wherein a junction between the voltage divider resistors 11 and 12 is connected to an input terminal of a controller 18 provided for controlling the voltage regulator 17. The other input terminal of the controller 18 is connected to an accelerating voltage setting circuit 19.

The electron gun 6 is constituted by a rod-like cathode 22 disposed as enclosed within a filament 21 and a Wehnelt electrode 23 disposed around the filament 21, wherein the filament 21 is connected to the filament power supply 7 while the rod-like cathode 22 is connected to the bombarding potential supply circuit 8. The Wehnelt electrode 23 is connected to the bias voltage source circuit 9.

A controller 24 connected to an electron beam current setting circuit 25 controls a current supplied to the Wehnelt electrode 23 from the bias voltage source circuit 9. The controller 24 has an input terminal connected to a circuit point between one of the output terminals of the rectifier circuit 15 and the beam current detecting resistor 13.

In addition, there is provided a focusing coil current setting circuit 27 for setting the position of the focal points of the focusing coils 4 and 5 by setting values of the currents supplied to the focusing coils 4 and 5, respectively.

Next, description will be directed to operation of the conventional electron beam processing apparatus of the structure mentioned above.

The filament 21 of the electron gun 6 is heated by the current supplied from the filament power supply 7, as a result of which thermions are emitted from the filament 21 and accelerated under the potential applied by the bombarding potential supply circuit 8, whereby the rod-like cathode 22 is bombarded with the accelerated thermions. Thus, there are generated from the surface of the rod-like cathode 22 secondary thermions which are then accelerated by the accelerating potential supply circuit 10 to thereby form an electron beam 3. The electron beam 3 generated in this way is focused through cooperation of the focusing coils 4 and 5 and caused to impinge onto the workpiece 2 disposed within the welding chamber 1. Under the energy of the incident electron beam, those surface portions of the workpiece 2 which are to be welded are molten to be bonded together.

The control of the current intensity of the electron beam 3 is carried out by applying to the Wehnelt electrode 23 which serves for a same function as a grid of a triode vacuum tube from the filament power supply 7, a potential which has negative polarity relative to that of the rod-like cathode 22. The actual intensity of the electron beam is detected by the beam current detecting resistor 13, the output signal of which is then fed back to the controller 24. Thus, the current intensity of the electron beam 3 is controlled by the controller 24 on the basis of a preset current value set at the electron beam current setting circuit 25.

In the accelerating potential supply circuit 10 for accelerating thermions to thereby form the electron beam 3, an AC voltage of the AC power supply 20 is transformed to a voltage of a predetermined level by the voltage regulator 17, which voltage is then applied across the primary winding of the step-up transformer 16, the secondary voltage of which is then rectified by the rectifier circuit 15 to be subsequently smoothed by the smoothing capacitor 14. In this manner, a high DC voltage is generated by the accelerating potential supply circuit 10.

The high DC voltage mentioned above is controlled by feeding back a voltage signal derived from the voltage divider resistor circuit (11, 12) to the controller 18 which controls the high DC voltage on the basis of a preset voltage set at the accelerating voltage setting circuit 19.

For controlling the position of the focal point or focal length by means of the focusing coils 4 and 5, values of the currents to be supplied to the focusing coils 4 and 5 are so set up by the focusing coil current setting circuit 27 as to realize an optimal focal length measured previously for a quantity of thermions generated at a predetermined current value set up by the electron beam current setting circuit 25.

Parenthetically, in the case where identical workpieces 2 are to be welded, the current values set up by the electron beam current setting circuit 25 and the focusing coil current setting circuit 27 are usually maintained to be constant during the welding so that the workpieces are processed under the same working conditions.

In the conventional electron beam processing apparatus, the focusing coil current is so controlled as to remain at a constant value set up in correspondence to the preset value of the electron beam current. In this conjunction, it should however be mentioned that the rod-like cathode 22 undergoes consumption with the substance thereof being sputtered or dissipated away from the peripheral surface thereof under heating and bombardment with primary thermions. Consequently, the distance between the peripheral surface of the rod-like cathode 22 and the filament 21 increases as the consumption of the rod-like cathode 22 proceeds, which results in lowering of the intensity of the electric field prevailing between the filament 21 and the rod-like cathode 22 and hence lowering of the heating temperature of the rod-like cathode 22. It is thus apparent that the quantity of secondary thermions emitted from the cathode 22 varies as a function of time laps even when the electron beam current is set at a same value, which is, of course, accompanied with a corresponding change of the focal length of the electron beam. To cope with such variation of the focal length of the electron beam, it is required that the operator monitors the focal length routinely to adjust manually the accelerating potential supply circuit 10 for the rod-like cathode 22 or control the focusing coil current for thereby adjusting the focal length of the electron beam, which is however very a complicate and troublesome procedure, requiring high skillfulness of the operator. Needless to say, failure in the adjustment of the focal length will lead to unsatisfactory result of the processing.

SUMMARY OF THE INVENTION

In the light of the state of the art described above, it is an object of the present invention to provide an electron beam processing apparatus which is capable of preventing occurrence of failure of the processing by automatically correcting variation of the focal length of the electron beam which takes place as the consumption of the rod-like cathode proceeds as the time elapses.

In view of the above and other objects which will become more apparent as the description proceeds, there is provided according to a first aspect of the present invention an electron beam processing apparatus, which includes an electron beam generating means for generating an electron beam, an electron beam focusing means for focusing the electron beam generated by the electron beam generating means to a predetermined position, a monitor means for monitoring a bias voltage applied to the electron beam generating means, and a correcting circuit for automatically correcting a lens current supplied to the electron beam focusing means on the basis of an output of the monitor means so that a focal length of the electron beam focusing means can constantly be maintained at a predetermined value.

By virtue of the arrangement of the electron beam processing apparatus described above, the focusing position of the electron beam can be maintained to be essentially constant by controlling the lens current in response to variation of the bias voltage, whereby high quality can be ensured for the processing such as welding with the control of the processing being facilitated.

According to a second aspect of the invention, there is provided an electron beam processing apparatus, which includes an electron beam generating means for generating an electron beam, an electron beam focusing means for focusing the electron beam generated by the electron beam generating means to a predetermined position, a monitor means for monitoring cathode temperature of a cathode electrode of the electron beam generating means, and a correcting circuit for automatically correcting a lens current supplied to the electron beam focusing means on the basis of an output of the monitor means so that a focal length of the electron beam focusing means can constantly be maintained at a predetermined value.

With the arrangement of the electron beam processing apparatus described above, the focusing position of the electron beam can be maintained to be essentially constant by controlling the lens current in response to variation in the temperature of the cathode, whereby high quality can be ensured for the processing such as welding with the control of the processing being facilitated.

In a preferred mode for carrying out the invention, the electron beam generating means may be constituted by a cathode, a filament enclosing the cathode and a grid electrode to which the bias voltage is applied from a bias voltage supply circuit, wherein the correcting circuit corrects automatically the lens current supplied to the beam focusing means on the basis of relations between the bias voltage or cathode temperature and the lens current as obtained experimentally for every given incremental change of the bias voltage or cathode temperature.

Further, the correcting circuit may be constituted by a microcomputer-based controller, and the above-mentioned relations may be stored in a memory provided in association with the microcomputer-based controller.

Further provided according to a third aspect of the present invention is an electron beam processing apparatus which includes an electron beam generating means for generating an electron beam, an electron beam focusing means for focusing the electron beam generated by the electron beam generating means to a predetermined position, a monitor means for monitoring a bias voltage applied to the electron beam generating means, an electrostatic lens for correcting a focal length of the electron beam focusing means, and a correcting circuit for automatically controlling the focal-length correcting electrostatic lens on the basis of an output of the monitor means so that a focal length of the electron beam focusing means can constantly be maintained at a predetermined value.

By controlling or regulating the voltage applied to the focal point correcting electrostatic lens in response to variations of the bias voltage, the focal length of the electron beam can be maintained to be essentially constant, whereby quality of the processing such as welding can be improved with the control therefor being facilitated. Besides, because the lens currents flowing through the focusing coils can be held at respective preset values as in the case of the conventional electron beam processing apparatus, the existing control system may be used without need for any significant modifications.

Furthermore, there is provided according to a fourth aspect of the present invention an electron beam processing apparatus which includes an electron beam generating means for generating an electron beam, an electron beam focusing means for focusing the electron beam generated by the electron beam generating means to a predetermined position, a monitor means for monitoring cathode temperature of a cathode electrode of the electron beam generating means, an electrostatic lens for correcting a focal length of the electron beam focusing means, and a correcting circuit for automatically controlling or correcting the focal-length correcting electrostatic lens on the basis of an output of the monitor means so that a focal length of the electron focusing means can constantly be maintained at a predetermined value.

By adjusting or regulating the voltage applied to the automatic focal-point correcting electrostatic lens in response to change in the temperature of the cathode, it is possible to maintain the focal length of the electron beam to be essentially constant. Additionally, high quality of the processing such as welding can be realized while the control therefor can be facilitated. Besides, because the lens current flowing through the focusing coils can be maintained at preset values, respectively, as in the case of the conventional electron beam processing apparatus, the existing control system need not be modified significantly. To say in another way, the control system incarnating the teachings of the present invention can be realized relatively easily and inexpensively and build in the existing electron beam processing apparatus.

In a preferred mode for carrying out the invention, the electrostatic lens may be constituted by a pair of mutually isolated ring-like electrodes disposed with a distance therebetween in a direction in which the electron beam travels and a voltage supply source for applying voltage to the ring-like electrodes, wherein the voltage is increased as the bias voltage or the cathode temperature becomes lower.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference will be made to the drawings, in which:

FIG. 7 is a view for graphically illustrating relations among heating time duration of a rod-like cathode, a vias voltage, temperature of the cathode and positional variation of a focal point as obtained experimentally in an electron beam processing apparatus implemented according to the invention as compared with a conventional apparatus.

DESCRIPTION OF THE PREFERRED EMBODIMENTS

Figure 1:
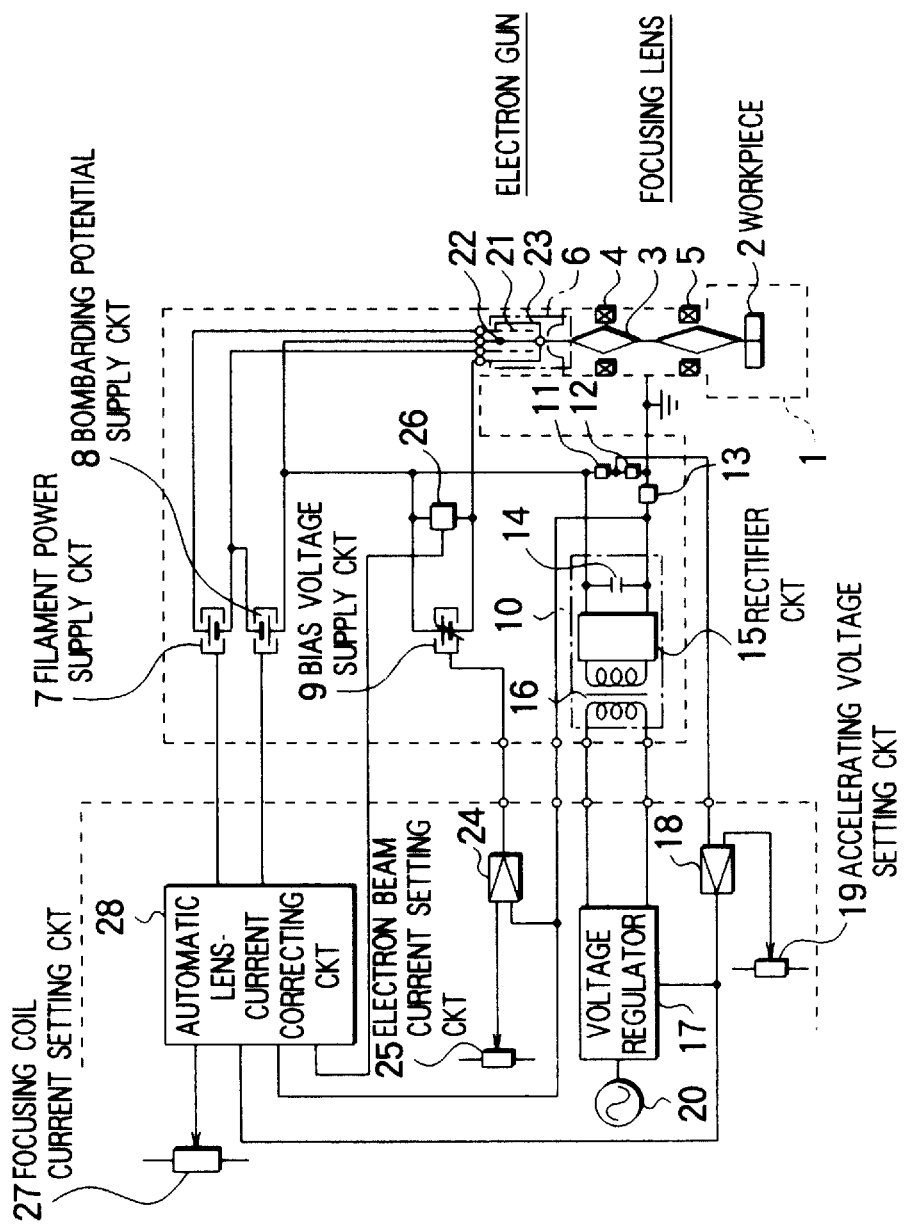
FIG. 1 is a block diagram showing a general arrangement of an electron beam processing apparatus according to a first embodiment of the invention.

Now, the present invention will be described in detail in conjunction with preferred or exemplary embodiments thereof by reference to the drawings. In the following description, like or equivalent parts are designated by like reference characters throughout the several figures.

Embodiment 1

Figure 6:
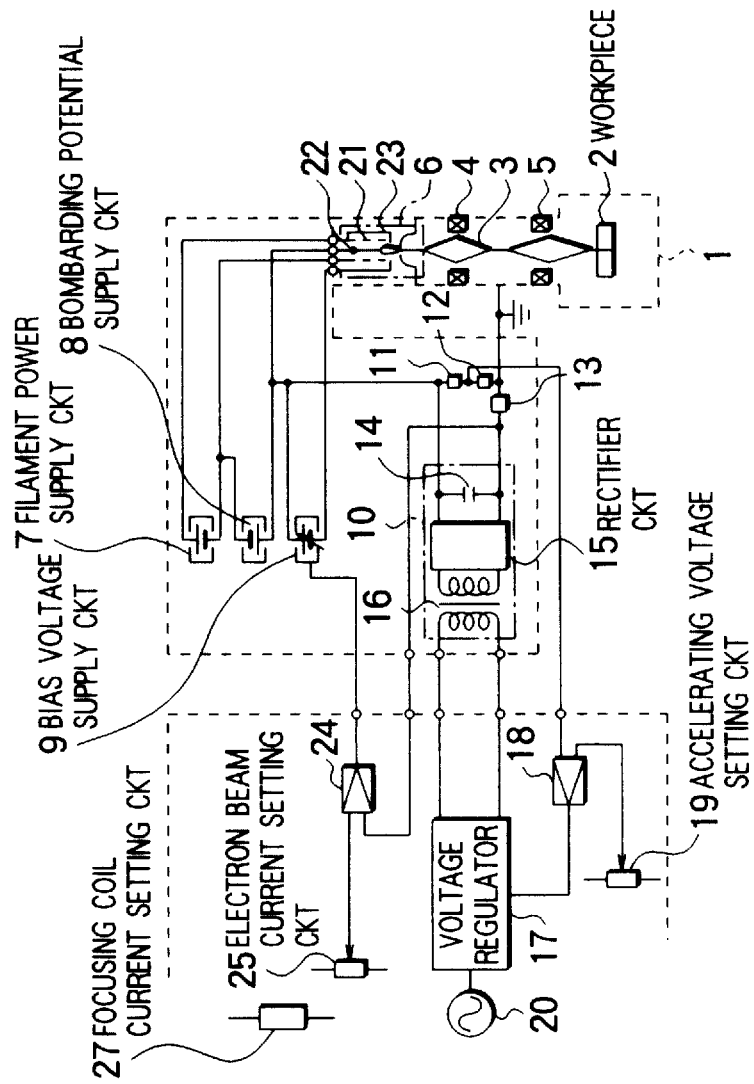
FIG. 6 is a circuit diagram showing a circuit configuration of a conventional electron beam processing apparatus.

FIG. 1 is a circuit diagram showing a structure of an electron beam processing apparatus according to a first embodiment of the present invention. In the figure, reference numerals 1 to 25 and 27 denote parts or components which are same as or equivalent to those designated by using like numerals in FIG. 6. Accordingly, repeated description thereof will be unnecessary. The electron beam processing apparatus according to the instant embodiment of the invention differs from the conventional apparatus shown in FIG. 6 in that there are additionally provided a bias voltage detecting circuit 26 which serves as a monitor means for detecting a bias voltage applied to the Wehnelt electrode 23 (i.e., grid electrode) of the electron gun 6 from the bias voltage supply circuit 9 and an automatic lens-current correcting circuit 28 for automatically correcting the currents supplied to the filament 21 and the rod-like cathode 22 from the filament power supply circuit 7 and the bombarding potential supply circuit 8, respectively, in dependence on change (e.g. reduction of diameter due to consumption) which the rod-like cathode 22 undergoes as a function of time lapse. Parenthetically, the focusing coils 4 and 5 cooperate to constitute the electron beam focusing means of the present invention, while the automatic lens-current correcting circuit 28 serves also as a correcting circuit for automatically correcting the lens currents supplied to the electron beam focusing means in accordance with the output of the monitor means so that the focal length of the electron beam focusing means can constantly be maintained at a predetermined value (i.e., the electron beam can remain substantially constant, to say in another way).

Next, description will turn to operation of the electron beam processing apparatus according to the instant embodiment of the invention.

The filament 21 of the electron gun 6 is heated by the current supplied from the filament power supply circuit 7, as a result of which thermions are emitted from the filament 21 and accelerated under the potential applied by the bombarding potential supply circuit 8, whereby the rod-like cathode 22 is bombarded with the accelerated thermions. Thus, there are emitted from the surface of the rod-like cathode 22 secondary thermions which are then accelerated under the potential applied by the accelerating potential supply circuit 10 to thereby form the electron beam 3.

When the distance between the outer periphery of the rod-like cathode 22 and the inner periphery of the filament 21 increases in accompanying consumption (e.g. reduction of diameter) of the rod-like cathode 22 which usually increases as the time lapses, the temperature of the rod-like cathode 22 becomes lowered, as a result of which a quantity of secondary thermions emitted from the rod-like cathode 22 will decrease. Under the circumstances, the bias voltage applied to the Wehnelt electrode 23 from the bias voltage supply circuit 9 is so controlled that the electron beam current (i.e., intensity of the electron beam) can remain substantially constant nevertheless of increase of the distance mentioned above. However, when the bias voltage is changed as mentioned above, the focal length of the focusing lens system (4, 5) will vary.

Accordingly, it is taught by the present invention incarnated in the instant embodiment that a lens current value corrected by the automatic lens-current correcting circuit 28 on the basis of the bias voltage detected by the bias voltage detecting circuit 26 is determined as a preset value for the focusing coil current setting circuit 27 with a view to making it possible to maintain the focal length of the focusing lens system (4, 5) to be essentially constant even when the rod-like cathode 22 undergoes a change (such as reduction of diameter) due to consumption which proceeds as the time elapses.

FIG. 7 is a view for graphically illustrating results of experiments conducted by the applicant of the present application. In the figure, the bias voltage, the temperature of the rod-like cathode 22 and the change of the position of the focal point of the electron beam are taken along the ordinate while the time duration of heating the rod-like cathode 22 is taken along the abscissa.

As can be seen in FIG. 7, when the heating time or duration of the electron gun 6 increases, the temperature of the cathode electrode constituting a part of the electron gun 6 becomes lowered due to the change in the geometry of the cathode electrode of the electron gun 6 (e.g. decreasing the outer diameter of cathode electrode of the electron gun 6 due to consumption thereof as a function of time lapse). Further, the bias voltage for the control for maintaining the electron beam current to be constant lowers as well. When the lens current is held at a constant value regardless of variations of the temperature of the electron gun 6 and/or the bias voltage, the position of the focal point of the electron beam focusing means (4, 5) will change increasingly.

By way of example, let's assume that the value of the lens current (i.e., currents supplied to the focusing coils 4 and 5) are set constant at 1300 mA. In that case, the position of the focal point changes about 1 mm after lapse of about 125 hours of the cathode heating period or duration, wherein the bias voltage is about 1222 V with the temperature of the rod-like cathode 22 being about 2780° K. In this conjunction, it has experimentally been established that the lens current value should be 1320 mA in order to cancel out or nullify the change of the position of the focal point, i.e., to reset the focal point of the focusing lens means (4, 5) to the initial position where the heating time duration is zero. To say in another way, a relation between the bias voltage and the lens current supplied to the focusing lens means (4, 5) as well as a relation between the lens current and the temperature of the rod-like cathode 22 of the electron gun 6 at a time point at which the cathode heating time duration is 125 hours can experimentally be determined. Thus, by determining experimentally the relations mentioned above for every incremental change of the bias voltage and/or the cathode temperature, it is possible to set the focusing lens current at such a value where positional displacement or change of the focal point becomes zero by monitoring the bias voltage or the cathode temperature.

In FIG. 7, positional changes of the focal point of the electron beam in the electron beam processing apparatus according to the instant embodiment of the invention as determined experimentally are represented by a polygonal curve labelled "POSITIONAL CHANGE OF FOCAL POINT WITH LENS CURRENT CORRECTION". It can be seen how successfully the positional change of the focal point of the electron beam can be suppressed according to the teaching of the invention when compared with a broken polygonal curve labelled "POSITIONAL CHANGE OF FOCAL POINT WITHOUT LENS CURRENT CORRECTION". More specifically, according to the invention, the focal point of the electron beam can essentially be protected against variation over a heating time duration of about 300 hours.

At this junction, it should be added that the invention has been described on the assumption that the cathode temperature becomes lowered as the rod-like cathode changes as the time lapses. However, the teachings of the invention can equally be applied to the case where the cathode temperature increases as the time lapses, due to difference in the material forming the cathode or geometry thereof.

Embodiment 2

Figure 2:
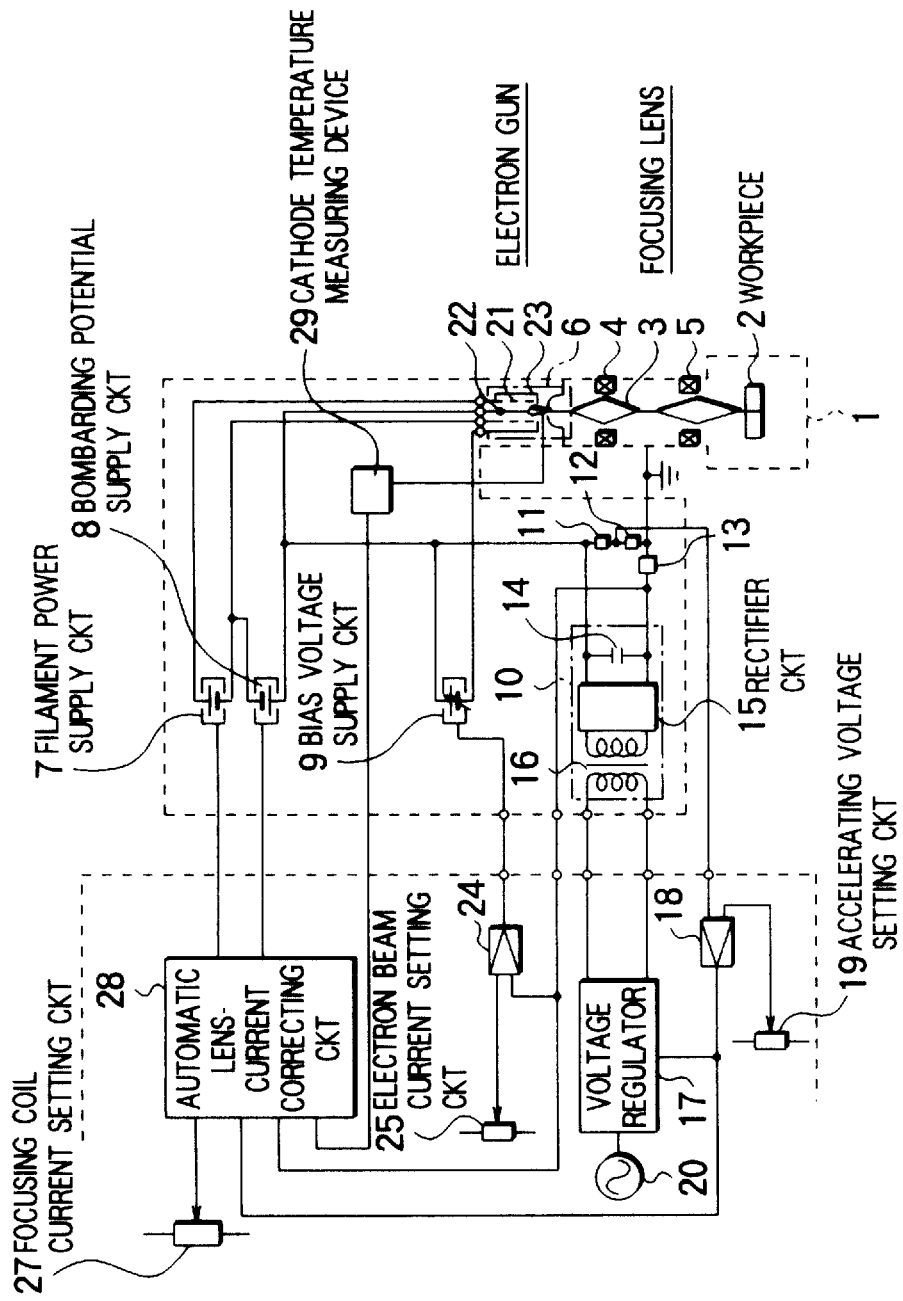
FIG. 2 is a block diagram showing a general arrangement of an electron beam processing apparatus according to a second embodiment of the invention.

FIG. 2 shows a circuit configuration of an electron beam processing apparatus according to a second embodiment of the present invention. The electron beam processing apparatus according to the instant embodiment differs from the apparatus of the first embodiment in that the bias voltage detecting circuit 26 for detecting the bias voltage applied to the Wehnelt electrode 23 from the bias voltage supply circuit 9 is replaced by a cathode temperature measuring device 29 which is designed for measuring the ambient temperature in the vicinity of the rod-like cathode 22, wherein the output signal of the cathode temperature measuring device 29 is supplied to the automatic lens-current correcting circuit 28 which responds thereto by changing the preset current value of the focusing coil current setting circuit 27 for thereby protecting the focal point of the electron beam against positional change nevertheless of change of the cathode temperature. Except for this difference, structure and operation of the electron beam processing apparatus according to the instant embodiment of the invention are substantially same as those of the first embodiment. Parenthetically, it should be mentioned that in the case of the electron beam processing apparatus according to the instant embodiment of the invention, the preset value of the focusing coil current setting circuit 27 increases as the cathode temperature lowers.

In this case, relations between the cathode temperatures and the lens currents can experimentally be determined beforehand for every incremental change of the cathode temperature and stored in a memory so that the automatic lens-current correcting circuit 28 can alter the preset current value of the focusing coil current setting circuit 27 on the basis of the aforementioned relations, as described previously in conjunction with the first embodiment of the invention.

As is apparent from the above description, it is possible to maintain the focal length at an essentially invariable value even when the cathode temperature changes as a result of change of the rod-like cathode 22 by correcting the lens current set at the focusing coil current setting circuit 27 on the basis of the cathode temperature measured by the cathode temperature measuring device 29.

Embodiment 3

Figure 3:
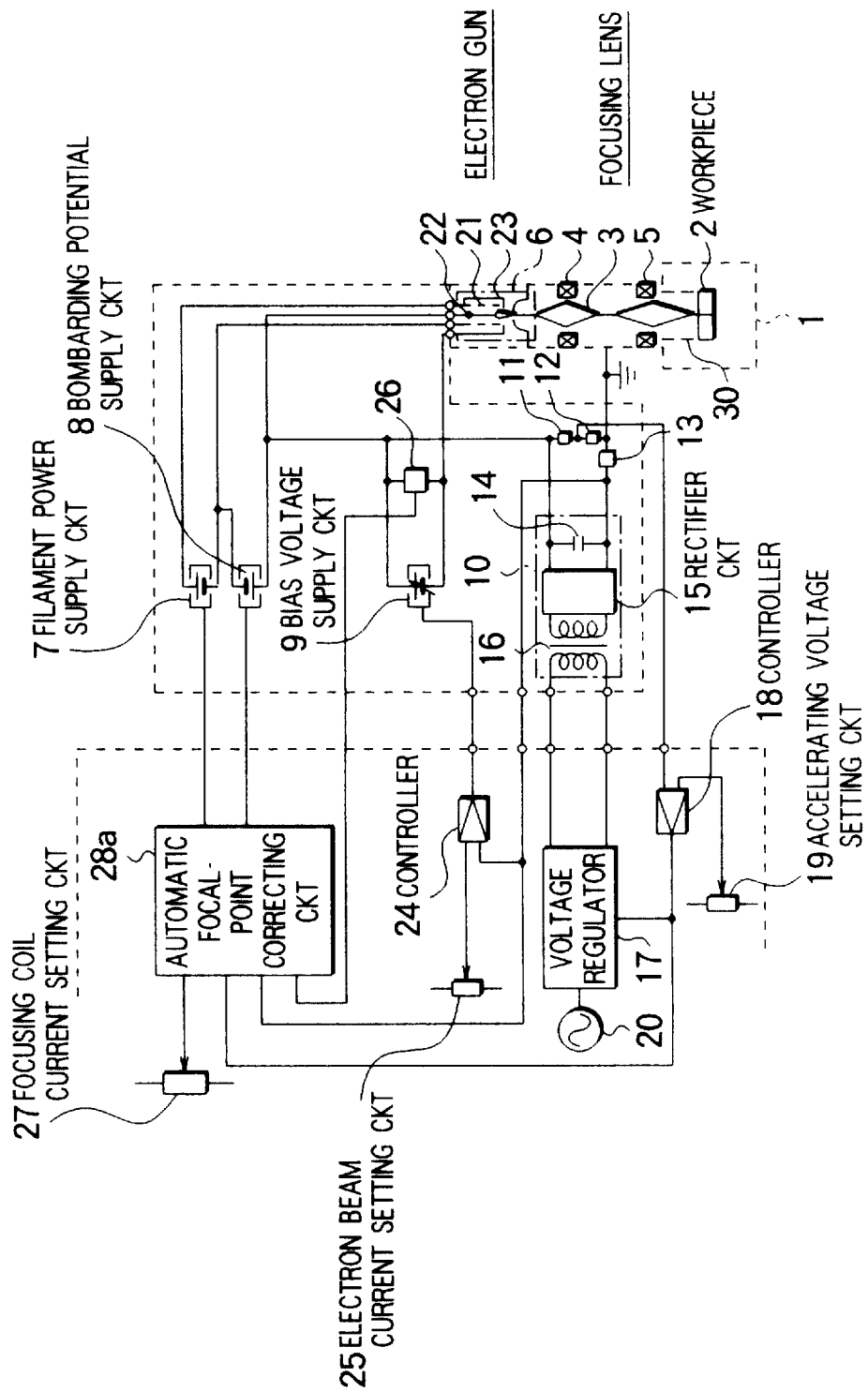
FIG. 3 is a block diagram showing a general arrangement of an electron beam processing apparatus according to a third embodiment of the invention.
Figure 4:
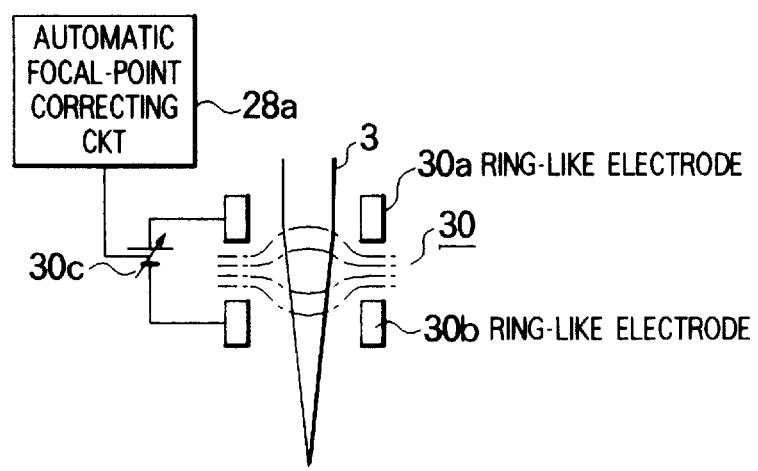
FIG. 4 is a block diagram showing a major portion of the electron beam processing apparatus shown in FIG. 3.

FIG. 3 is a circuit diagram showing a structure of an electron beam processing apparatus according to a third embodiment of the present invention. The electron beam processing apparatus now under consideration differs from that of the first embodiment shown in FIG. 1 in that a focal-point correcting electrostatic lens 30 is additionally provided for correcting the focal point of the electron beam in place of correcting the lens currents supplied to the focusing coils 4 and 5 on the basis of the bias voltage detected by the bias voltage detecting circuit 26. More specifically, referring to FIG. 4, the focal-point correcting electrostatic lens 30 is comprised of a pair of mutually isolated ring-like electrodes 30a and 30b displaced with a distance therebetween in the direction in which the electron beam 3 travels and a power supply circuit 30c for applying voltages to the ring-like electrodes 30a and 30b, wherein an electrostatic lens is formed through cooperation of the ring-like electrodes 30a and 30b upon application of the voltage from the power supply circuit 30c.

The power supply circuit 30c is controlled by a signal generated by an automatic focal-point correcting circuit 28a so as to correct the focal point of the electron beam by adjusting appropriately the voltages applied to the ring-like electrodes 30a and 30b. The automatic focal-point correcting circuit 28a serves for substantially same function as the automatic lens-current correcting circuit 28. It should however be noted that the automatic focal-point correcting circuit 28a is not so arranged as to correct the lens currents supplied to the focusing coils 4 and 5 on the basis of the bias voltage detected by the bias voltage detecting circuit 26 but correct the output voltage of the power supply circuit 30c for the focal-point correcting electrostatic lenses 30. More specifically, the voltage of the power supply circuit 30c is so controlled as to increase as the bias voltage as detected becomes lower.

With the arrangement according to the instant embodiment of the invention, the values of the lens currents supplied to the focusing coils 4 and 5, respectively, can be held as they are, as in the case of the conventional electron beam processing apparatus, which means that remarkable modification of the control system can be avoided, to an advantage.

Parenthetically, it should be added that the automatic focal-point correcting circuit 28a constitutes the correcting circuit for automatically controlling the focal-point correcting electrostatic lens which in turn functions to correct the focal length of the electron beam focusing means on the basis of the output of the monitor means so that the focal length of the electron beam can constantly be maintained at a predetermined value.

Embodiment 4

Figure 5:
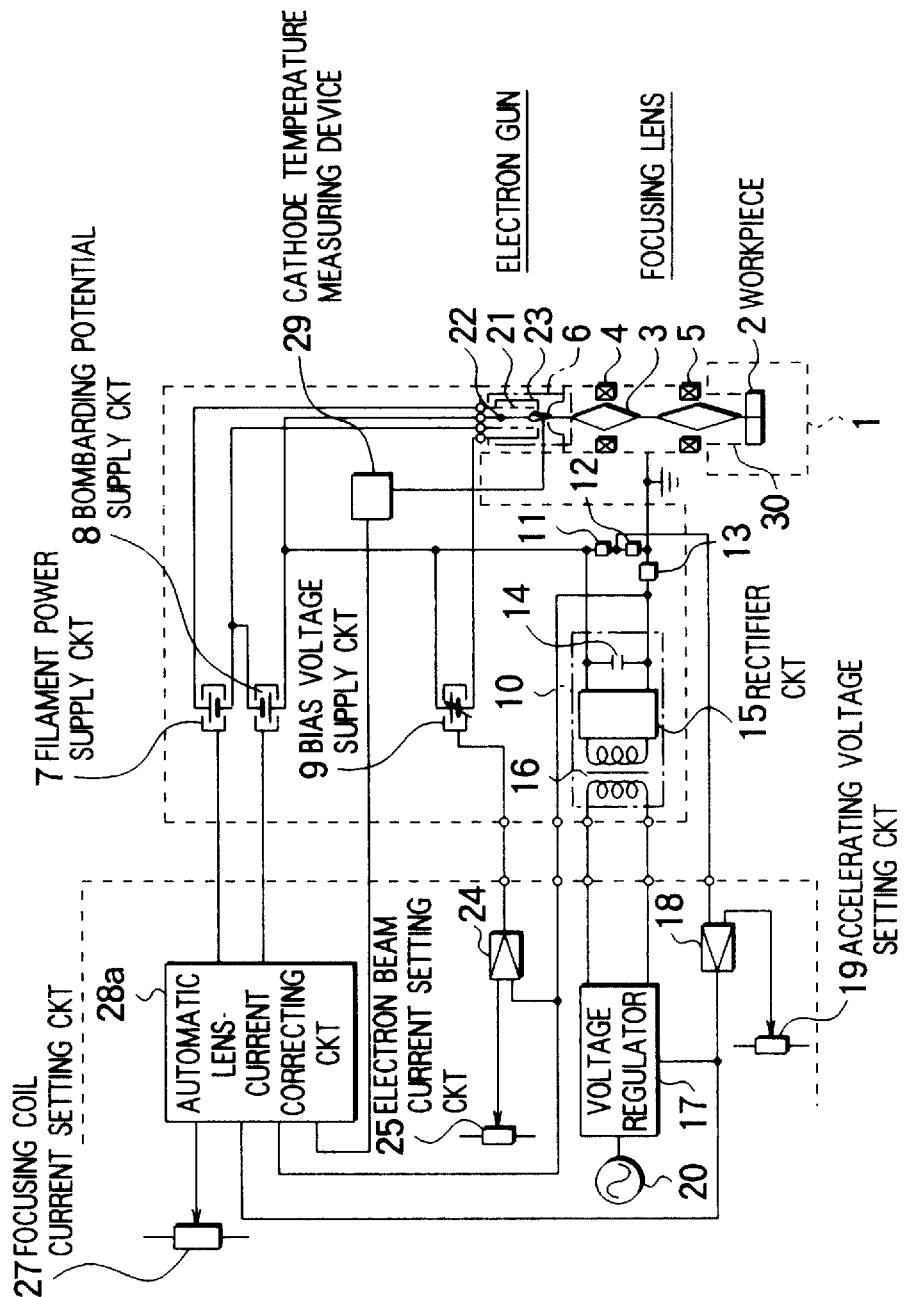
FIG. 5 is a block diagram showing a general arrangement of an electron beam processing apparatus according to a fourth embodiment of the invention.

FIG. 5 is a diagram showing a structure of an electron beam processing apparatus according to a fourth embodiment of the present invention. In the case of the third embodiment described above by reference to FIGS. 3 and 4, the focal point of the electron beam is corrected by means of the focal-point correcting electrostatic lens 30 by monitoring the bias voltage. In the electron beam processing apparatus according to the instant embodiment of the invention, correction of the focal point is realized by controlling the focal-point correcting electrostatic lens 30 on the basis of the cathode temperature as detected by monitoring the temperature of the rod-like cathode 22.

More specifically, in the electron beam processing apparatus now under consideration, the cathode temperature measuring device 29 for measuring the ambient temperature in the vicinity of the rod-like cathode 22 is provided in place of the bias voltage detecting circuit 26 which serves for detecting the bias voltage applied to the Wehnelt electrode 23 (i.e., grid electrode), wherein the output of the cathode temperature measuring device 29 is inputted to the automatic focal-point correcting circuit 28a for controlling the voltage of the power supply circuit 30c for the focal-point correcting electrostatic lens 30 in dependence on the detected cathode temperature. Except for this difference, the structure and operation of the electron beam processing apparatus according to the fourth embodiment of the invention are similar to those of the third embodiment described previously in conjunction with the third embodiment.

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, the automatic lens-current correcting circuit 28, the automatic focal-point correcting circuit 28a and the like may be constituted by a microcomputer. Further, the relation between the bias voltage and the lens current as well as the relation between the cathode temperature and the lens current as determined experimentally may be stored in a memory so that they can be referenced by the microcomputer.

Accordingly, all suitable modifications and equivalents may be resorted to, falling within the spirit and scope of the invention.

We claim:

1. An electron beam processing apparatus, comprising:
   electron beam generating means for generating an electron beam including a cathode, a filament enclosing said cathode and a grid electrode to which a bias voltage is applied from a bias voltage supply circuit;
   electron beam focusing means for focusing the electron beam generated by said electron beam generating means to a predetermined position;
   monitor means for monitoring said bias voltage applied to said electron beam generating means; and
   a correcting circuit for automatically correcting a lens current supplied to said electron beam focusing means, a current supplied to the filament and a current supplied to the cathode on the basis of an output of said monitor means so that a focal length of said electron beam focusing means can be constantly maintained at a predetermined value and so as to correct for a change in diameter of the cathode over time.

2. An electron beam processing apparatus according to claim 1,
   wherein said correcting circuit corrects automatically said lens current supplied to said beam focusing means on the basis of relations between said bias voltage and said lens current as obtained experimentally for every given incremental change of said bias voltage.

3. An electron beam processing apparatus according to claim 2,
   wherein said correcting circuit is constituted by a microcomputer-based controller;
   said relations being stored in a memory provided in association with said microcomputer-based controller.

* * * * *